United States Patent
Liu et al.

(10) Patent No.: US 11,613,253 B2
(45) Date of Patent: Mar. 28, 2023

(54) METHOD OF MONITORING LOCALIZATION FUNCTIONS IN AN AUTONOMOUS DRIVING VEHICLE

(71) Applicant: Baidu USA LLC, Sunnyvale, CA (US)

(72) Inventors: Xiaodong Liu, Sunnyvale, CA (US); Ning Qu, Sunnyvale, CA (US); Yaoming Shen, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 210 days.

(21) Appl. No.: 16/425,927

(22) Filed: May 29, 2019

(65) Prior Publication Data

US 2020/0377078 A1 Dec. 3, 2020

(51) Int. Cl.
| | |
|---|---|
| *G05D 1/00* | (2006.01) |
| *B60W 30/09* | (2012.01) |
| *G05D 1/02* | (2020.01) |
| *B60W 30/12* | (2020.01) |

(Continued)

(52) U.S. Cl.
CPC ............ *B60W 30/09* (2013.01); *B60W 30/06* (2013.01); *B60W 30/12* (2013.01); *B60W 30/18109* (2013.01); *G05D 1/0088* (2013.01); *G05D 1/0214* (2013.01); *B60W 2400/00* (2013.01); *B60W 2520/10* (2013.01);

(Continued)

(58) Field of Classification Search
CPC ................ B60W 30/09; B60W 30/12; B60W 30/18109; B60W 2554/00; B60W 2400/00; B60W 2520/10; B60W 2540/18; G05D 1/0088; G05D 1/0214; G05D 2201/0213

See application file for complete search history.

(56) References Cited

U.S. PATENT DOCUMENTS

| | | | |
|---|---|---|---|
| 9,612,123 B1* | 4/2017 | Levinson | B60W 30/09 |
| 2018/0024562 A1* | 1/2018 | Bellaiche | G06T 7/73 |
| | | | 701/26 |
| 2018/0067966 A1* | 3/2018 | Oder | G01S 13/865 |

(Continued)

*Primary Examiner* — Elaine Gort
*Assistant Examiner* — Chanmin Park
(74) *Attorney, Agent, or Firm* — Womble Bond Dickinson (US) LLP

(57) ABSTRACT

In one embodiment, a method for monitoring a localization function in an autonomous driving vehicle (ADV) can use known static objects as ground truths to determine when the localization function encounter errors. The known static objects are marked on a high definition (HD) map for the real-time driving environment. When the ADV detects one or more known static objects, the ADV can use sensor data, locations of the one or more static objects, and one or more error tolerance parameters to create a localization error tolerance area surrounding a current location of the ADV. The ADV can project the tolerance area on the HD map, performs a localization operation to generate an expected location of the ADV on the HD map, and determines whether the generated location falls within the projected tolerance area. If the generated location falls outside the projected tolerance area, indicating a localization function of the ADV encounter errors, the ADV can generate an alarm to alert a human driver to switch to a manual driving mode. If no human driver is available in the ADV, the ADV can activate a vision-based fail-safe localization procedure.

23 Claims, 10 Drawing Sheets

(51) Int. Cl.
*B60W 30/06* (2006.01)
*B60W 30/18* (2012.01)

(52) U.S. Cl.
CPC ..... *B60W 2540/18* (2013.01); *B60W 2554/00* (2020.02); *G05D 2201/0213* (2013.01)

(56) References Cited

U.S. PATENT DOCUMENTS

| | | | |
|---|---|---|---|
| 2018/0188734 A1* | 7/2018 | Zhu | B60W 30/095 |
| 2019/0078896 A1* | 3/2019 | Zhu | G08G 1/20 |
| 2019/0106117 A1* | 4/2019 | Goldberg | G06F 11/00 |
| 2019/0138024 A1* | 5/2019 | Liang | G06K 9/6273 |
| 2019/0204092 A1* | 7/2019 | Wheeler | G05D 1/0246 |
| 2020/0225363 A1* | 7/2020 | Samii | G01S 19/23 |
| 2020/0257301 A1* | 8/2020 | Weiser | G05D 1/0214 |
| 2020/0273197 A1* | 8/2020 | Zhao | B60W 60/001 |
| 2020/0364247 A1* | 11/2020 | Van Sickle | G06K 9/00637 |
| 2020/0365029 A1* | 11/2020 | Kourous-Harrigan | G05D 1/0055 |
| 2020/0384987 A1* | 12/2020 | Preissler | B62D 15/0285 |

* cited by examiner

400

| Application 401 | Planning and Control 402 | Perception 403 | Device Driver(s) 404 | Firmware 405 | Hardware 406 |

FIG. 4

METHOD OF MONITORING LOCALIZATION FUNCTIONS IN AN AUTONOMOUS DRIVING VEHICLE

TECHNICAL FIELD

Embodiments of the present disclosure relate generally to operating autonomous vehicles. More particularly, embodiments of the disclosure relate to monitoring localization functions in an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An autonomous driving vehicle (ADV) often relies on information on a high definition (HD) map for routing planning. Information on an HD map, such as locations of traffic lights, road conditions, and stop signs, can provide useful references for the ADV in planning its routes. Efficient route planning requires accurately localizing an ADV on a HD map so that the ADV can limit its search for references in an small area around the ADV.

A variety of localization techniques can be used in an ADV, each of which is prone to inaccuracy, for example, due to sensor signal loss. Localization inaccuracy, once passing certain thresholds, can cause an ADV to take an incorrect route and run into surrounding vehicles or pedestrians. For an ADV travelling on a highway, localization inaccuracy is particularly dangerous.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating architecture of an autonomous driving system according to one embodiment.

DETAILED DESCRIPTION

Figure 1:
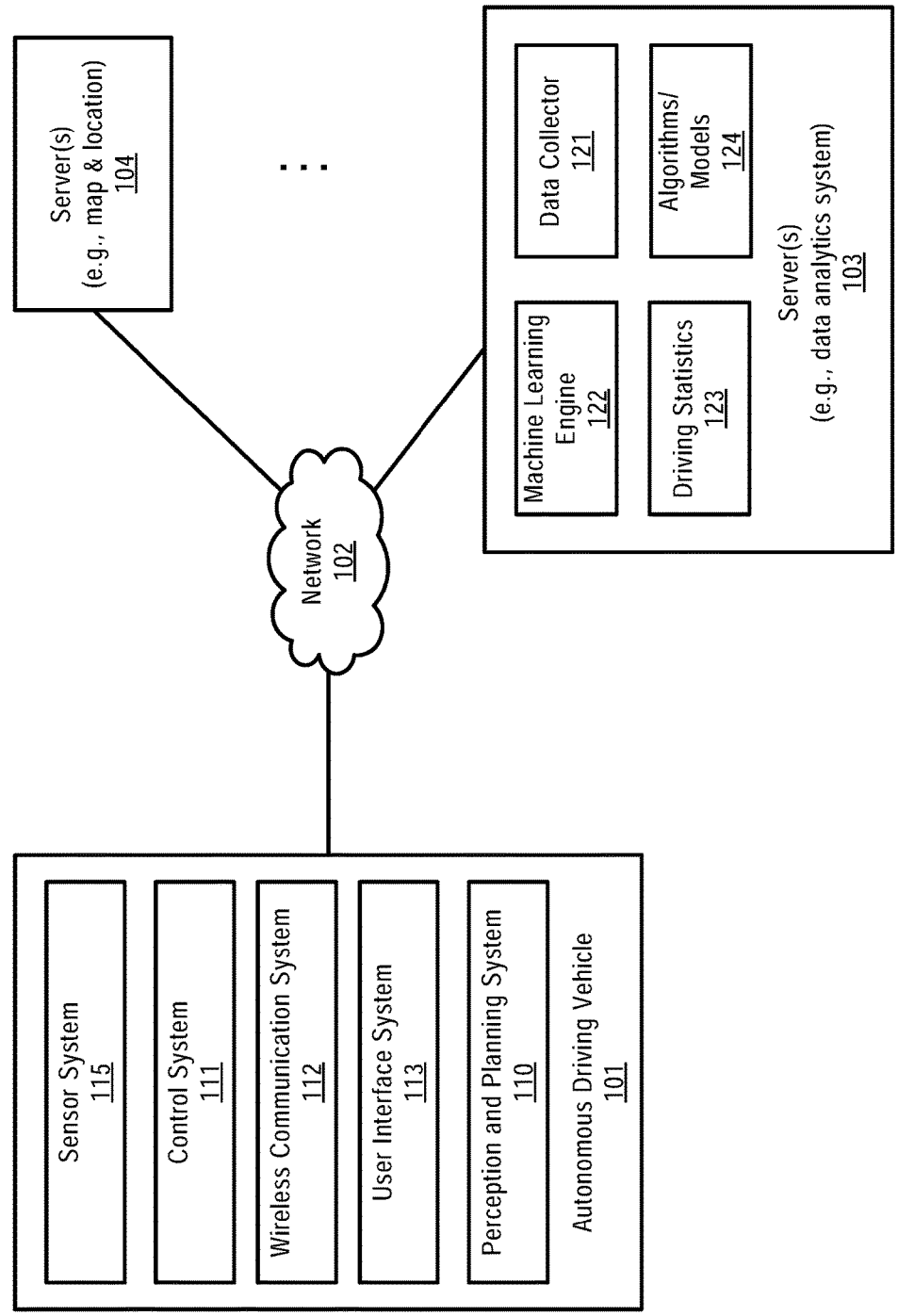
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, methods and systems described in the disclosure use known static objects as ground truths to determine in real-time if a localization function in the ADV has encountered errors. The known static objects are located in a real-time driving environment and are also marked on the HD map. In one embodiment, in response to detecting one or more such known static objects in the real-time driving environment, the ADV can perform a localization operation using a localization function to determine an expected location of the ADV on the HD map. The ADV can calculate a distance between the expected location and each of the one or more known static objects based on their associated global coordinates. The ADV can further acquire a distance between the ADV and each known static object in the real-time driving environment. For example, the ADV can receive the distance from one or more roadside devices. Alternatively, the ADV can measure the distance by using one or more sensors mounted on the ADV.

In one embodiment, the ADV can determine if a difference between each calculated distance and its corresponding measured distance falls within a predefined range. If the difference falls outside the predefined range, the ADV can determine that the localization function encounter errors and can generate an alarm to alert a human driver to switch the ADV to a manual driving mode. Alternatively, the ADV can determine that the localization function encounter errors and generate a command to activate a fail-safe procedure immediately or after a recovery window has passed. For example, if no human driver is detected in the ADV or the human driver cannot timely switch the ADV to a manual driving mode, the ADV can generate the command. The fail-safe procedure can use a vision-based localization function in planning routes.

In another embodiment, in response to detecting a known static object in the real-time driving environment, the ADV determines a location of the ADV in the real-time driving environment based at least on a location of the known static object and a distance between the known static object and the ADV. The ADV can use the location of the known static object and at least the distance between the known static object and the ADV to determine a location of the ADV in the real time driving environment. The ADV can subsequently determine a tolerance area surrounding the determined location of the ADV based on one or more error tolerance parameters associated with the distance. When the localization function of the ADV performs normally, the expected location and the calculated location of the ADV should be approximately the same. The tolerance area (also referred to as a monitory boundary) can be a polygon-shaped area calculated based on one or more error tolerance parameters for each sensor measurement (e.g., a speed measurement and a distance measurement).

In one embodiment, in response to determining that the expected location of the ADV falls outside the tolerance area, the ADV can generate an alarm and use one or more occupant detection sensors to determine whether a human driver is available in the ADV. If a human driver is available in the ADV, the human driver can switch the ADV to a manual driving model upon hearing the alarm. However, if no human driver is detected or a detected human driver does not switch the ADV within a predetermined window of time after the alarm is generated, the ADV can issue one or more control commands to control the ADV to follow a current lane if physical lane marks or virtual lane marks for the current lane are available to enable the ADV to stay in the current lane. If the localization function resumes its normal performance within the predetermined recovery window while the ADV is travelling in the current lane, the ADV can continue using the localization function in route planning. If the localization function does not resume its normal performance within the predetermined recovery window, the ADV can activate a fail-safe procedure to control the ADV into a safer position, including stopping or parking the ADV. If neither physical lane marks nor virtual lane marks are available, the fail-safe procedure can be activated immediately.

In one embodiment, the ADV can receive the distance between the ADV and a known static object from one or more sensors mounted on the ADV. The one or more sensors can measure the distance and send the measured distance to a localization monitor in the ADV. Alternatively, the ADV can receive the distance from one or more roadside devices/sensors, which can measure the distance between the ADV and the known static object and send the measured distance to the localization monitor in the ADV.

In one embodiment, each known static object can be a roadside device/sensor. In such an implementation, the distance between the roadside device/sensor and the ADV can be measured by one or more sensors mounted on the ADV or by the known static object itself.

In one embodiment, when roadside devices/sensors are used to measure distances, the measured distances can be sent directly to the ADV or can be stored in one or more cloud servers, from which the ADV can retrieve the measured distances.

In one embodiment, instead of using known static objects, dynamic locations of vehicles surrounding the ADV can be used to determine the location of the ADV in the real-time environment. The determined location of the ADV can then be compared with a location of the ADV generated by a localization function to determine whether the localization function had encountered errors.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
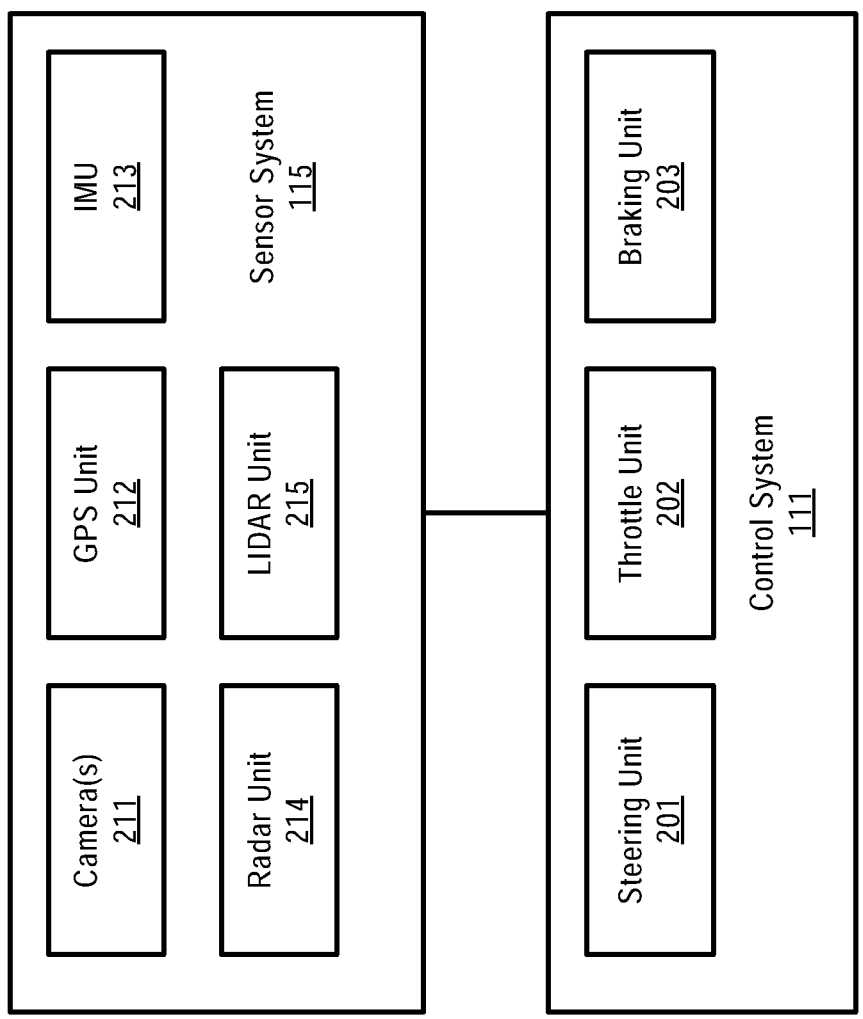
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes.

Figure 3A:
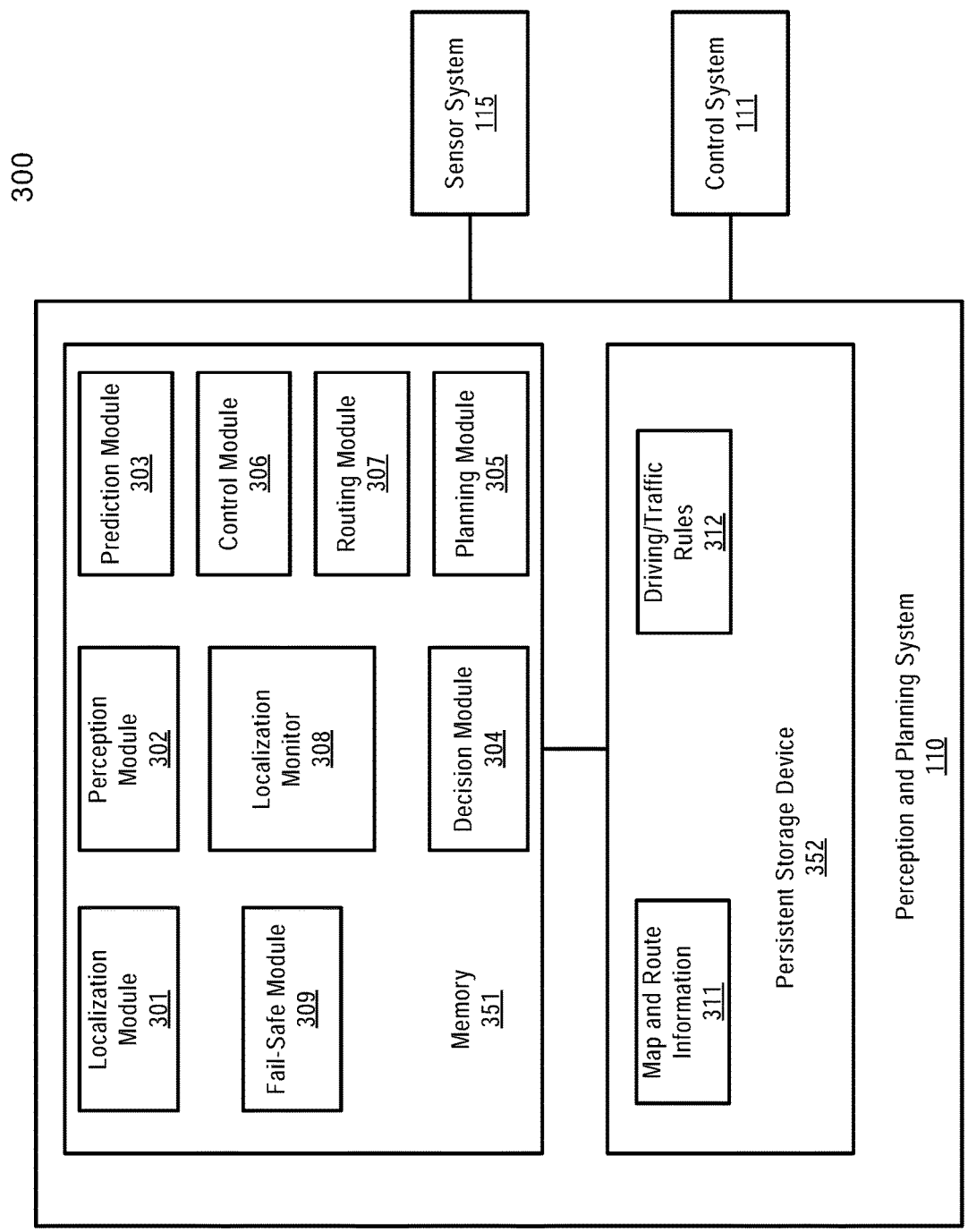
FIGS. 3A-3B are block diagrams illustrating an example of a perception and planning system used with an autonomous vehicle according to one embodiment.
Figure 3B:
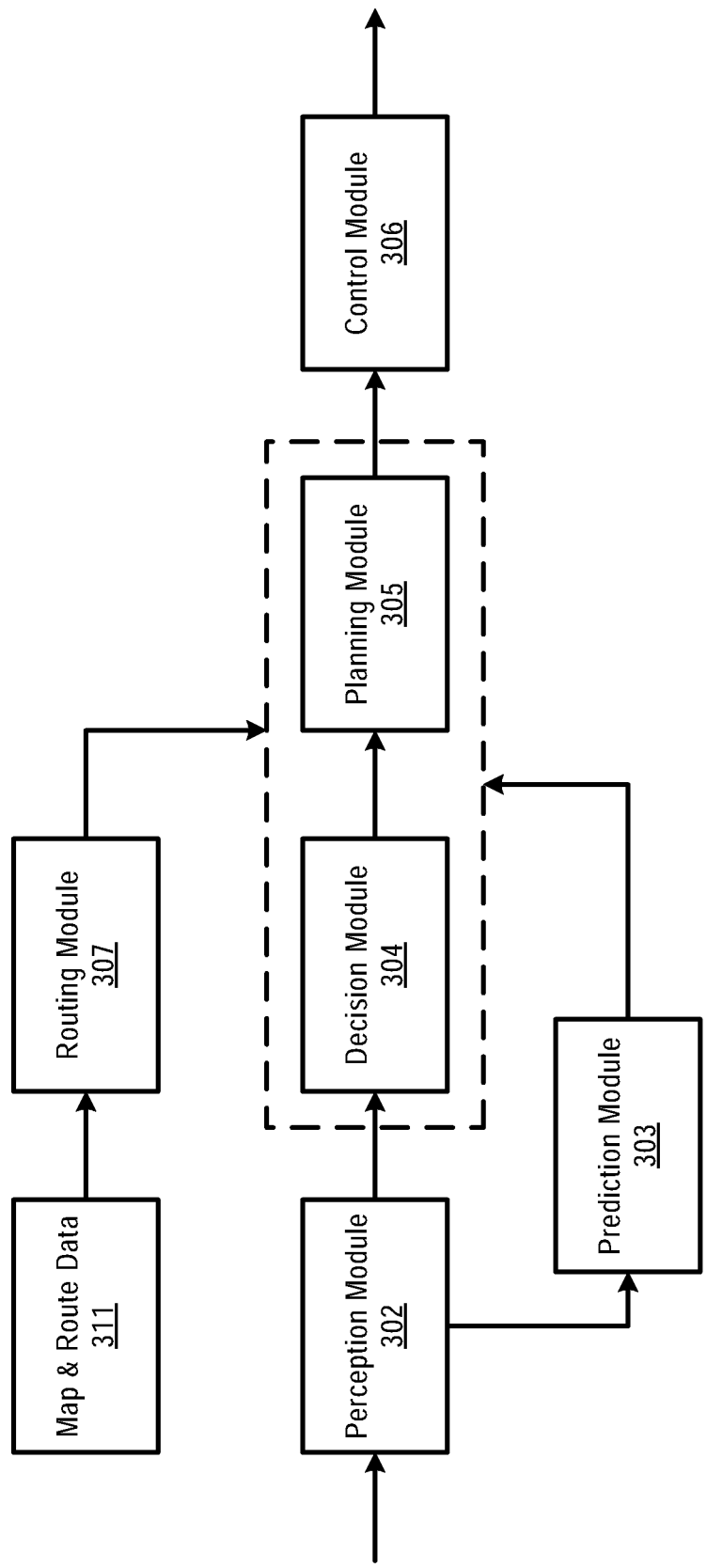

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, localization monitor 308, and fail-safe module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

In one embodiment, the decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, the localization monitor module 308 can determine whether the localization module 301 performs as expected and, if not, issues one or more control commands to control the ADV to follow a current lane based on lane marks of the current lane. If the localization function resumes its normal performance within a predetermined recovery window, the ADV can continue using the localization function in route planning. Otherwise, the ADV can activate activates the fail-safe module 309 to control the ADV into a safer position, including stopping or parking the ADV.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Localization Monitor

In one embodiment, the localization module 301 can be used to localize the ADV on a high definition (HD) map so that the ADV can efficiently plan routes according to information on the HD map.

In one implementation, the ADV can use a number of localization approaches to determine the location of the ADV on a HD map. One of the approaches is GPS/RTK (real time kinematics), in which a GPS receiver capable of RTK receives normal signals from the Global Navigation Satellite Systems along with a correction stream received from an RTK network of base stations to achieve higher positional accuracy. Another approach is to use a pre-built point cloud map coupled with LiDAR scanning to determine the location of the ADV based on how well the real-time point clouds generated by the LiDAR scanning match a relevant portion of the pre-built point cloud map. A third approach is to combine the two approaches. Such combination may achieve centimeter level of localization accuracy.

However, the localization accuracy of each approach can be affected by external factors. For example, an ADV traveling under a tunnel, between high buildings, or outside the RTK coverage may receive weakened GPS/RTK signals, thus impacting the localization accuracy. As another example, the pre-built point cloud map may differ significantly from real-time LiDAR scanned images due to environment changes, which also impacts localization accuracy. In some embodiments, each sensor may receive normal signals, but the localization module 301 may not fuse these signals appropriately Embodiments described in the disclose can monitor the localization accuracy of the location module 301 and switch to a backup vision-based localization system in the event that the primary localization function performed by the localization module 301 fails to meet one or more predetermined threshold values.

Figure 5:
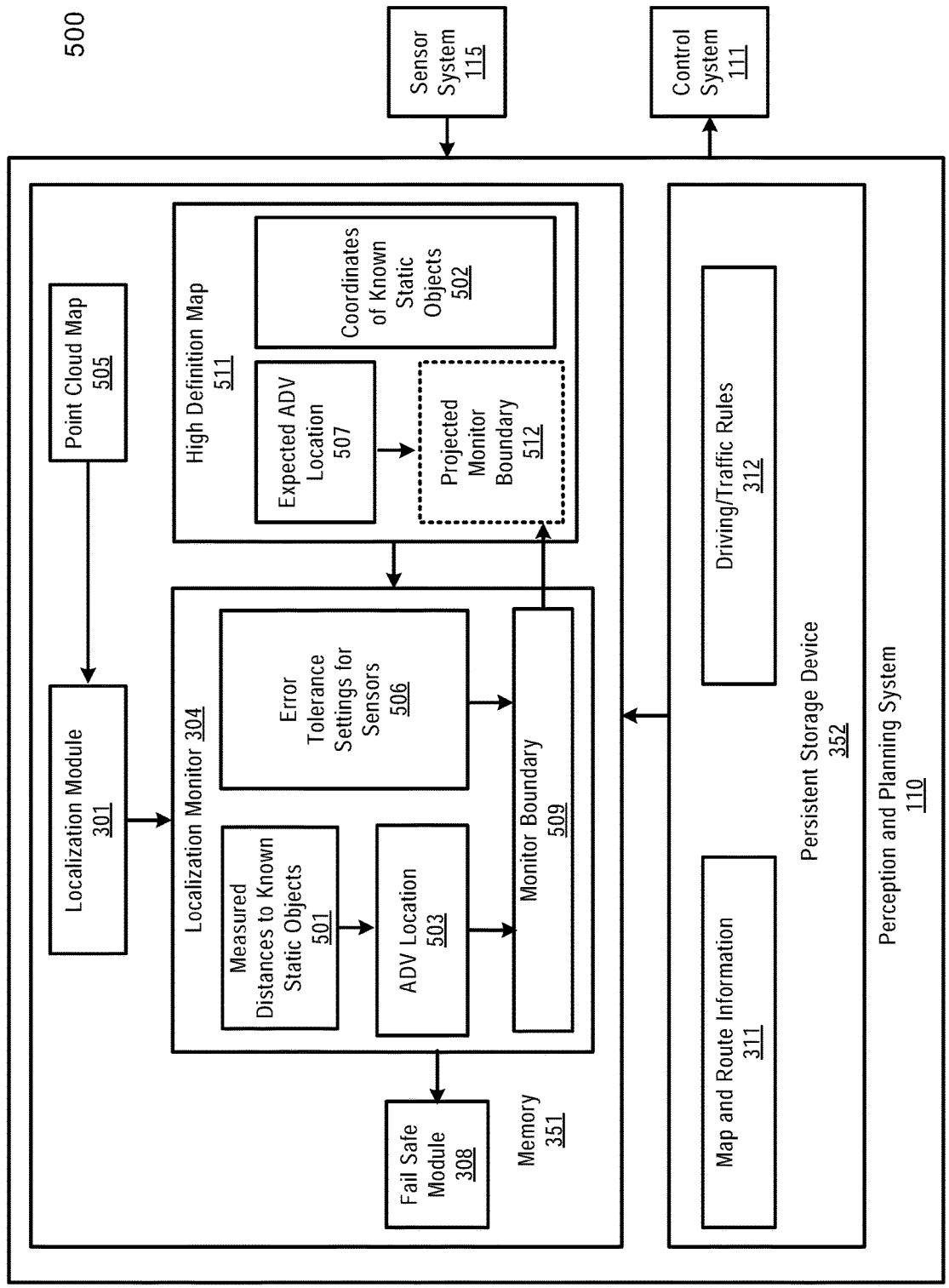
FIG. 5 illustrates an example of a system for monitoring localization functions in an autonomous driving vehicle according to one embodiment.

FIG. 5 illustrates an example of a system 500 for monitoring localization functions in an ADV according to one embodiment. The localization monitor 308 in the system 500 can use a location of the ADV 503 and one or more error tolerance settings 506 to calculate a monitor boundary 509. The monitor boundary 509 indicates an accepted error tolerance area for sensor measurements, and can be represented by a number of geographic location points surrounding the location 503.

In accordance with an embodiment, the localization monitor 308 can calculate the monitor boundary 509 using different algorithms depending on how many known static objects are within the detection range of the ADV while the ADV is travelling along a planned route in the real-time driving environment. A known static object is a physical object in the real-time driving environment and also marked on a high definition (HD) map 511 with a unique identifier and global coordinates specifying the location of the object. The HD map 511 can be updated at a configurable interval to include new static objects and remove static objects that no longer exist in the real-time driving environment. The known static objects may not be evenly distributed in the real-time driving environment. Therefore, the ADV may detect zero, one, or more of the known static objects in each detection cycle of a sensor (e.g., a LiDAR scanning cycle) or a driving cycle.

In one embodiment, when the ADV enters the driving environment (e.g., a particular road segment), the corresponding portion of the HD map 511 can be loaded into the ADV. If at least two known static objects are detected, the localization monitor 308 can execute a double-object algorithm to calculate the monitor boundary 509.

According to the double-object algorithm, the ADV can use one or more sensors mounted on the ADV (e.g., LiDAR sensors) to measure distances from the ADV to the first known static object, and use the measured distances 501 in conjunction with the global coordinates of the first two known static objects to calculate the location 503 of the ADV.

In accordance with an embodiment, the ADV location 503 in the real-time driving environment can be represented by a pair of global coordinates, and can have a corresponding position on the HD map 511. With the ADV location 503 determined, the localization monitor 308 can create a polygon around the ADV location 503 using one or more error tolerance parameters for the measurement of distance, which can be obtained from the error tolerance settings for sensors 506.

In one embodiment, the error tolerance settings 506 can be a configuration file, a lookup table, or a static random access memory (SRAM) that stores an error tolerance range for each of a number of sensor measurements. As described above, the ADV can include sensors configured to sense the steering angle of a steering wheel, wheels of the vehicle, or a combination thereof; the speed of the ADV; and the distance of the ADV to a surrounding object. The sensor data from the sensors may not be 100% accurate, and errors within a particular range for each sensor may not impact the autonomous driving of the ADV. The error tolerance settings 506 can specify acceptable error tolerance ranges for the sensors.

In one embodiment, the error tolerance settings can be determined based on technical specifications of the sensors or based on historical driving statics. For example, if a LiDAR sensor on the ADV has a ranging accuracy of 5-10 cm, the error tolerance range for a distance measured using the LiDAR sensor can be set to 10 cm or 20 cm. In one implementation, the localization monitor 308 can select the error tolerance range of 20 cm, and draw two pairs of parallel lines around the ADV location 503. Each pair of parallel lines is approximately perpendicular to a line from the ADV location 503 to one of the first two known static objects, and the distance between the pair of parallel lines equates to the selected error tolerance range of 20 cm. The two pairs of parallel lines can intercept each other to form a diamond-shaped monitor boundary.

In an alternative embodiment, when the ADV detect a single known static object in the real-time driving environment in a sensor detection cycle or an ADV driving cycle, a single-object algorithm can be used by the localization monitor 308 to create the monitor boundary 509.

According to the single-object algorithm, the localization monitor 308 first determines the ADV location 503 based on a previous location of the ADV, a steering angle, and a speed of the ADV. The previous location can be generated by the location module 301. With the ADV location 503 determined, the localization monitor 308 can determine the monitor boundary 509 surrounding the ADV position 503 using a number of error tolerance parameters obtained from the error tolerance settings 506. The error tolerance parameters 506 can include an error tolerance parameter for a speed sensor, a steering angle sensor, and a distance sensor (e.g., a LiDAR sensor). The shape of the monitor boundary 509 is determined by which error tolerance parameters are used.

In one embodiment, a user-preference setting can be dynamically invoked based on one or more factors including road conditions, traffic conditions, and whether the ADV is travelling in a rural or an urban area. For example, if the ADV is travelling in a rural area, the localization monitor 308 can use the error tolerance parameters for the speed sensor and the distance sensor. If the ADV is travelling in an urban area, the localization monitor 308 can use the error tolerance parameters for the speed sensor, the steering angle sensor, and the distance sensor to obtain a more accurate location for the ADV.

In one embodiment, the localization monitor 308 can project the calculated monitor boundary 509 on the HD map as a monitor boundary 512. Projecting the calculated monitor boundary 511 includes locating a corresponding position on the HD map 511 for each vertex of the polygon-shaped monitor boundary 509. The localization monitor 308 can calculate a pair of global coordinates for each vertex based on the global coordinates of the location of the ADV 503 and the error tolerance ranges used to calculate the monitor boundary 509.

With the monitor boundary 509 projected on the HD map 511, the localization monitor 308 can determine whether an expected location 507 generated by the localization module 301 on the HD map 511 falls within the projected monitor boundary 512.

In one embodiment, the localization module 301 can generate an expected location of the ADV based on a point cloud map 505 and/or sensor data from the sensor system 115 each driving cycle, every several driving cycles, every sensor detection cycle (e.g., a LiDAR scanning cycle), or every few sensor detection cycles.

In one embodiment, regardless of the frequency of location generation by the localization module 301, the monitor boundary 509 only checks whether the most recently generated location of the ADV falls within the projected monitor boundary 512 on the HD map 511. In this example, the expected location of the ADV 507 is the mostly recently generated location by the localization module.

If the most recently generated location of the ADV falls within the projected monitor boundary 512, the localization monitor 308 can determine that the localization module 301 performs as expected, and that the localization inaccuracy range of the localization module 301 is in a predetermined scope.

If the most recently generated location of the ADV falls outside the projected monitor boundary 512, the localization monitor 308 can determine that the localization inaccuracy range of the localization module 301 exceeds the predetermined scope. In such a case, the localization module 301 can use sensor data to determine whether the ADV can stay in a current physical lane or current virtual lane. A physical lane is a lane identified by lane marks, whereas a virtual lane is a lane that is identified other indictors or determined by a fuzzy logic based on the driving surroundings. For example, a virtual lane can be created by the ADV based on the edge of the road.

If the localization monitor 308 determines that a physical lane or a virtual lane is not available, the localization monitor 308 can immediately activate a fail-safe module 309 to issue one or more control commands to control the ADV into a safer place, including navigating the ADV into a closest parking space marked on the HD map 511. The fail-safe module 309 can use a vision-based localization approach, as the GPS/RTK approach and/or LiDAR/point cloud localization approach used by the localization module 301 may not work as expected.

If the ADV is travelling in a virtual lane or a physical lane when the localization module 301 encounters unacceptable localization inaccuracies, the localization monitor 308 can activate a timer while continuing to verify the localization accuracy of the localization module 301 using one or more additional known static objects along a planned route for the ADV.

If the localization monitor 308 determines that a new location generated by the localization module 301 falls within a new monitor boundary projected on the HD map 511 before the timer expires, the ADV can continue travelling on the road using the localization module 308.

If the timer expires before the ADV can detect at least one known static object while travelling in the physical or virtual lane, the localization monitor 308 can activate the fail-safe module 308.

Figure 6:
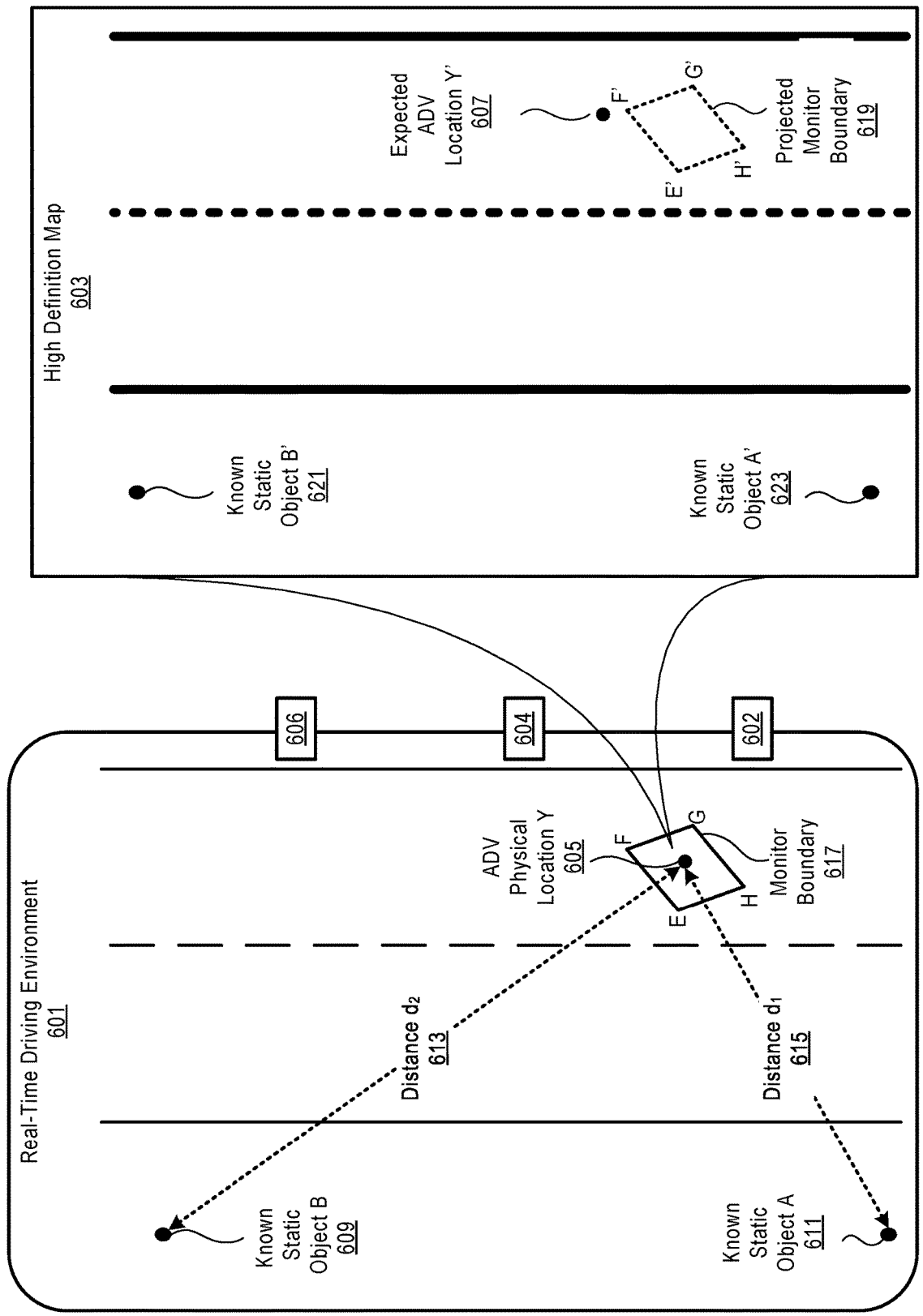
FIG. 6 is a graphical illustration of an example process of monitoring a localization function in an autonomous driving vehicle according to one embodiment.

FIG. 6 is a graphical illustration of an example process of monitoring a localization function in an ADV according to one embodiment. As shown in FIG. 6, an ADV travelling in a real-time driving environment 601 detects two known static objects 609 and 611, each of which is marked on a high definition (HD) map 603. For example, object A 611 is marked as object A' 623 on the HD map 603, and object B 609 is marked as object B' 621 on the HD map 603.

When sensors on the ADV detect object A 611 and object B 609, the sensors can measure a distance $d_1$ from object A 611 to the ADV and a distance $d_2$ from object B 609 to the ADV. Based on the measured distances $d_1$ and $d_2$, the known global coordinates of object A 611 and object B 609, a localization monitor on the ADV can calculate a physical location Y 605 of the ADV in the real-time driving environment at a particular point of time (e.g., to), and calculate a monitor boundary 617 surrounding the physical location Y 605 of the ADV. In one embodiment, the ADV can also acquire a distance between the ADV and each of the known static objects 611 and 609 from one or more of roadside devices 602, 604, and 606. The one or more roadside devices can measure the distance between the ADV and the known static object, and send the measured distance to the localization monitor 308 in the ADV.

In this illustration, EH and FG are parallel to each other and both are perpendicular to the line from the object A to the ADV. The pair of parallel lines represents an error tolerance range for the measured distance $d_1$. Similarly, EF and GH are parallel to each and both are perpendicular to the line from object B 609 to the ADV. The pair of parallel lines represents an error tolerance range for the measured distance $d_2$. The two pairs of parallel lines can intercept each other to form the monitor boundary 617.

The localization monitor in the ADV can calculate the global coordinates of each vertex of the polygon-shaped monitor boundary 617 based on the global coordinates of the physical location Y 605 of the ADV, the error tolerance ranges for the measured distances $d_1$ and $d_2$, and the global coordinates of object A 611 and object B 609.

The localization monitor can project the monitor boundary 617 on the HD map 603. The polygon E'F'G'H' on the HD map 603 represents the projected monitor boundary 619. With the global coordinates of each vertex of the projected monitor boundary known on the HD map 603, the localization monitor can determine whether an expected location Y' 617 of the ADV generated by the localization module in the ADV falls within the projected monitor boundary 619. In this example, the expected location Y' falls outside the projected monitor boundary 619.

Figure 7:
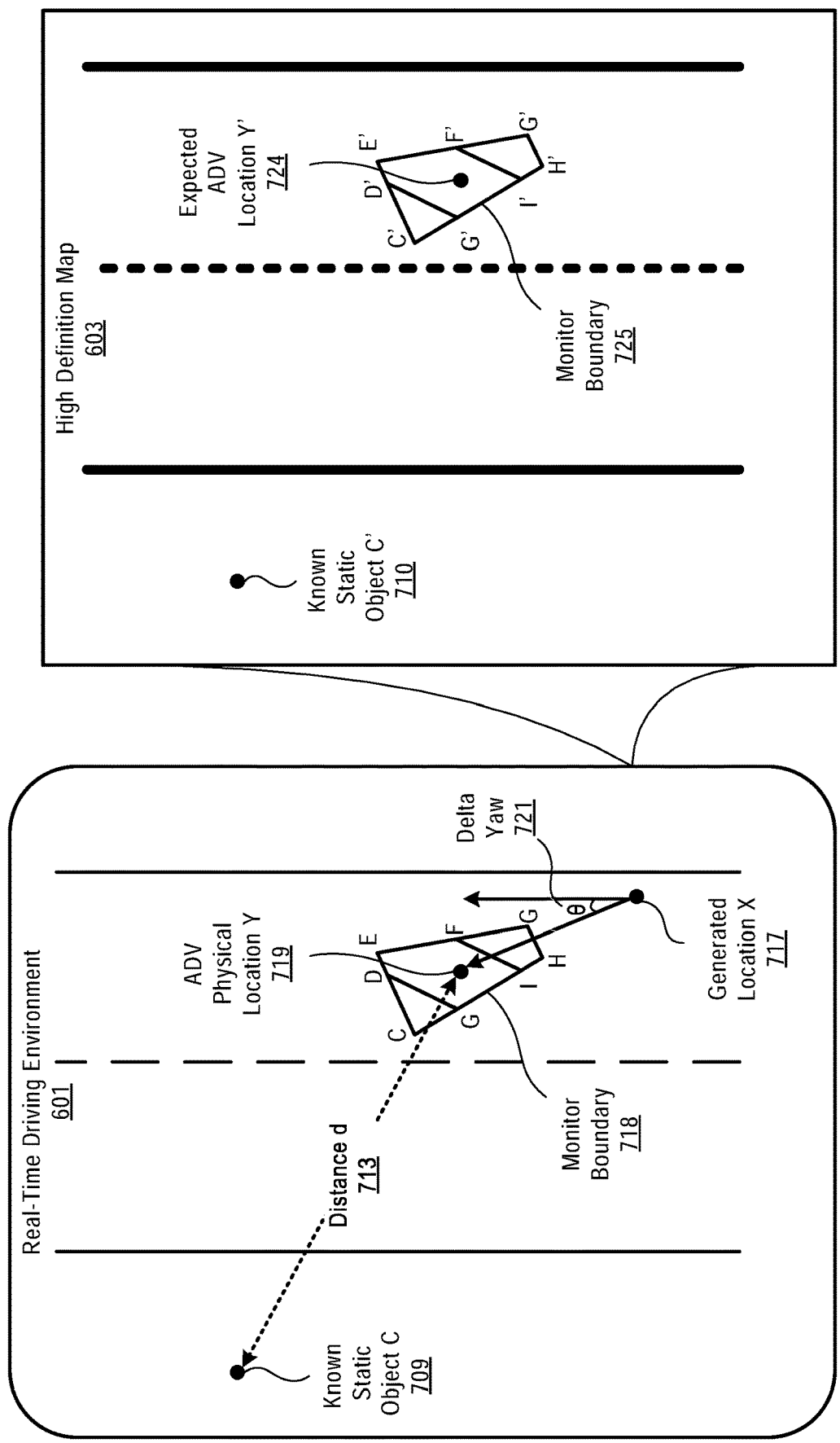
FIG. 7 is a graphical illustration of another example process of monitoring a localization function in an autonomous driving vehicle according to one embodiment.

FIG. 7 is a graphical illustration of another example process of monitoring a localization function in an ADV according to one embodiment. In this illustration, an ADV travelling the real-time driving environment 601 detects only one known static object (e.g., object C 709) at a particular point of time. The known static object C 709 is marked as object C' 710 on the HD map 603.

A localization monitor can determine a current location 719 of the ADV based on a previous location 717 generated by a location module on the ADV, the frequency of location generation by the location module (e.g., every 100 ms), and a steering angle θ 721. Alternatively, the current location of the ADV Y 710 can be calculated based on the previously generated location 717, the location of object C 709, and the measured distance d between the ADV and the object C 709.

In the illustration, CH and EG represent an error tolerance for the steering angle, DG and FI represents an error tolerance range for the measured distance d, CE and HG represents an error tolerance range for a calculated distance between location X 717 and the current physical location Y 719. The lines represents the different error tolerance ranges can intercept each other to create a monitor boundary DEFIG 718. A pair of global coordinates can also be determined for each vertex of the monitor boundary 718 based on the information used to create the monitor boundary. The monitor boundary 718 can then be projected on the HD map 603 as a projected monitor boundary D'E'F'I'G' 719.

The location monitor can compare the global coordinates of each vertex of the projected monitor boundary 725 with a pair of global coordinates of an expected ADV location Y' 724 generated by the location module in the ADV, to determine whether the expected ADV location Y' 724 falls within the projected monitor boundary 725.

Figure 8:
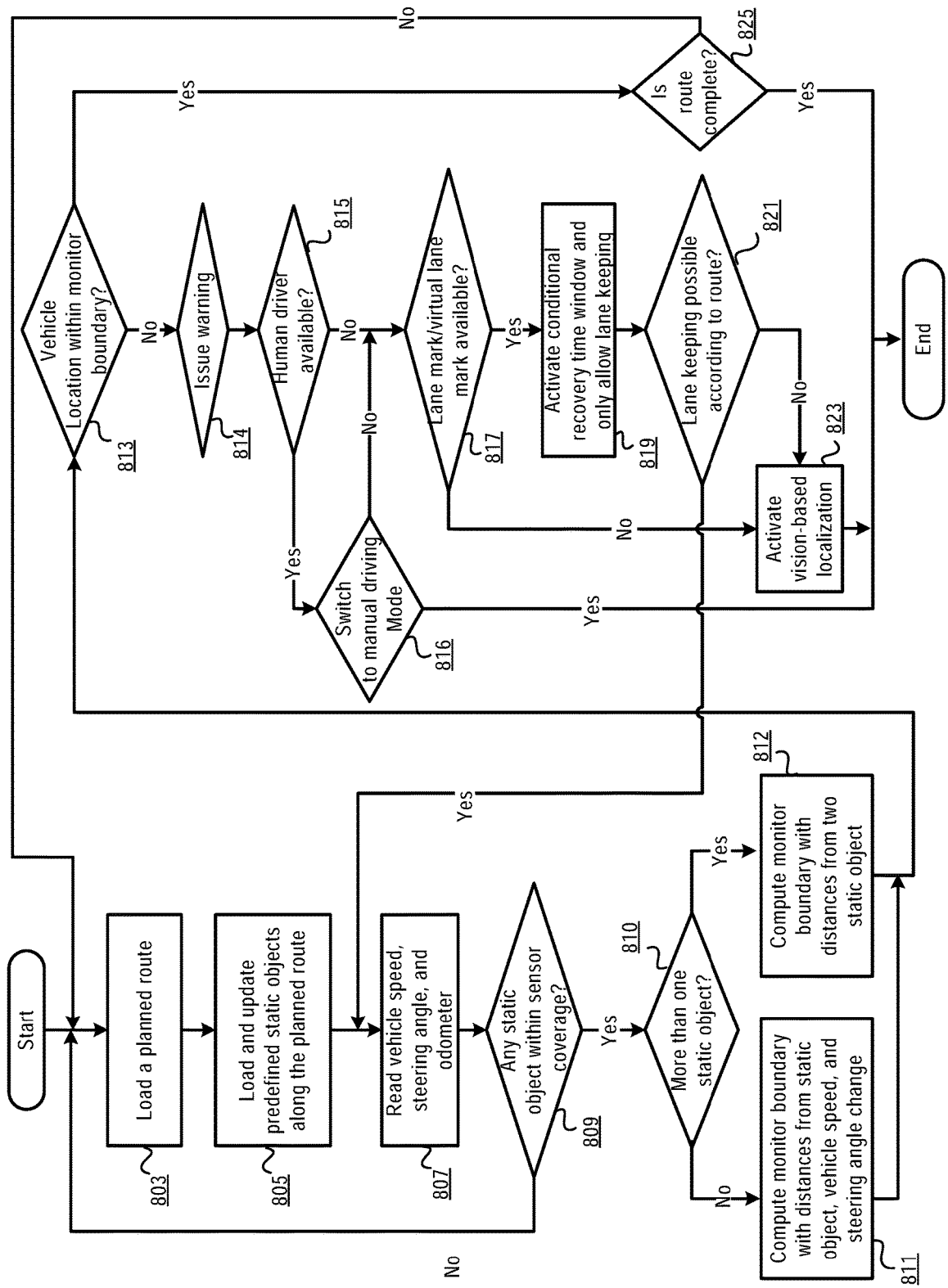
FIG. 8 is a flow diagram illustrating an example process of monitoring a localization function in an autonomous driving vehicle according to one embodiment.

FIG. 8 is a flow diagram illustrating an example process of monitoring a localization function in an ADV according to one embodiment. As shown in FIG. 8, in operation 803 of the example process, the ADV can load an HD map for route planning, and can update the HD map with a route planned by a perception and planning system on the ADV.

In operation 805, the ADV can load predefined known static objects along the planned route on the HD map, and update the HD map with any newly added known static objects along the planned route.

In operation 807, the ADV can read a current speed, a steering angle, an odometer of the ADV to determine the current speed, the current steering angle and the current mileage on the odometer.

In operation 809, the ADV checks if any known static objects along the planned route has been detected by sensors mounted on the ADV. If no known static object has been detected, the ADV can continue travelling along the planned route until one or more known static objects marked along the planned route has been detected.

In operation 810, the ADV can check whether more than one known static objects have been detected.

In operation 811, only one known static object is detected, and the ADV can compute a monitor boundary based at least on the known location of the static object, the current vehicle speed, and the steering angle change. In one embodiment, a previous location of the ADV determined by a localization module can also be used when calculating the monitor boundary.

In operation 812, more than one known static objects (e.g., two objects) are detected, and the ADV can compute a monitor boundary based on the locations of the two known static objects and other information as described above in the disclosure.

In operation 813, the ADV can determine whether a location generated by the localization module on the ADV falls within the calculated monitor boundary computed in operation 811 or operation 812.

In operation 825, the location generated by the localization module on the ADV falls within the calculated monitor boundary, and the ADV checks if the ADV has travelled to the end of the planned route. If yes, the example process will come to an end; otherwise, the ADV will repeat the operations described above.

In operation 814, the location generated by the localization module on the ADV falls outside the calculated monitor boundary computed in operation 811 or operation 813. In such a case, the ADV can issue a warning, for example, generating an alarm.

In operation 815, the ADV checks whether a human driver is available in the ADV.

In operation 816, a human driver is available in the ADV. The human driver can switch the ADV from an automatic driving mode to a manual driving mode upon hearing the alarm, which will end the example process.

In operation 817, no human driver is available in the ADV, and the ADV can determine based on sensor data whether physical lane marks or virtual lane marks are available to enable the ADV to continue travelling in a current lane. If neither physical lane marks nor virtual lane marks are available, the ADV can activate a vision-based localization function in operation 823. The operation 817 can also be triggered where a human driver is available but does not switch the ADV to a manual driving mode within a predetermined period of time.

In operation 819, the ADV has determined based on sensor data that physical lane marks or virtual lane marks are available to enable the ADV to continue travelling in a current lane. The ADV in this operation can activate a timer defining a conditional recovery window and in the meantime only issue one or more control commands to keep the ADV within the lane identified by the physical lane marks or the virtual lane marks.

In operation 821, it is possible to stay in the current lane, and the example process can go back to the operation 807 where the ADV starts to read the current speed, the steering angle, and the odometer of the ADV.

In operation 823, it is not possible to stay in the current lane, and the ADV can activate the vision-based localization function end the example process.

Figure 9:
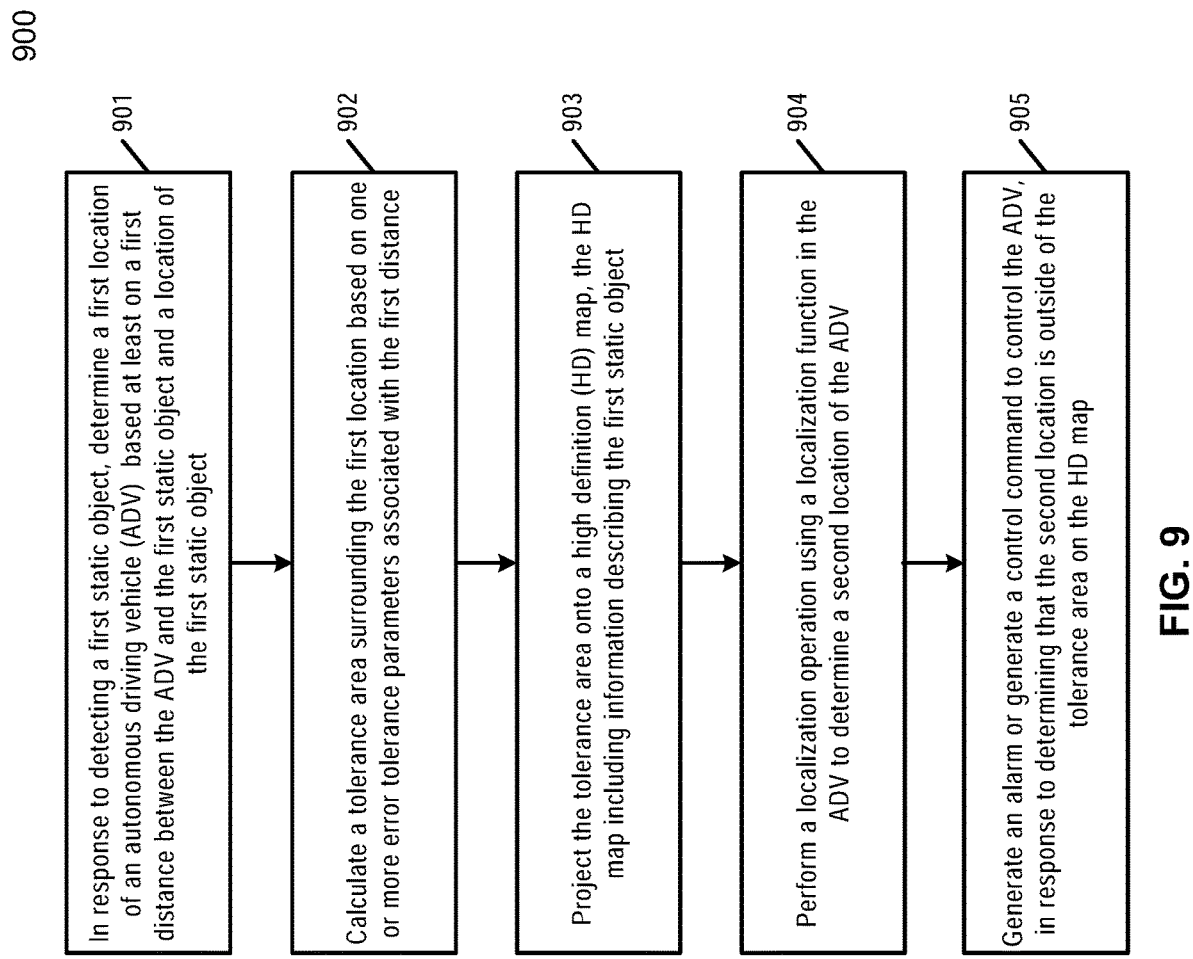
FIG. 9 illustrates another example process of monitoring a localization function in an autonomous driving vehicle according to an embodiment.

FIG. 9 illustrates another example process 900 of monitoring a localization function in an ADV according to an embodiment.

Process 900 may be performed by processing logic which may include software, hardware, or a combination thereof. Process 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In one embodiment, process 900 may be performed by one or more of the localization module 308, the localization module 301, or the fail-safe module 309.

Referring to FIG. 9, in operation 901, in response to detecting a first static object, the processing logic determines a first location of the ADV based at least on a first distance between the ADV and the first static object, and a location of the first static object, wherein the first distance is measured by one or more sensors mounted on the ADV. In operation 902, the processing logic calculates a tolerance area surrounding the first location based on one or more error tolerance parameters associated with the first distance. In operation 903, the processing logic projects the tolerance area onto a high definition (HD) map, the HD map including information describing the first static object. In operation 904, the processing logic performs localization operation using a localization function in the ADV to determine a second location of the ADV. In operation 905, the processing logic generates an alarm or issue a control command to control the ADV in response to determining that the second location is outside of the tolerance area on the HD map. If a human driver is available, the generated alarm can alert the human driver to switch to a manual driving mode; otherwise, a control command can be generated by the ADV to control the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for monitoring localization functions of an autonomous driving vehicle (ADV), the method comprising:
   determining a first location of the ADV based at least on a first distance between the ADV and a first static object and a location of the first static object;
   calculating a tolerance area surrounding the first location based on two or more of a plurality of error tolerance parameters, wherein the tolerance area is a polygon, and where the plurality of error tolerance parameters include a speed tolerance associated with a current speed of the ADV, a steering angle tolerance associated with a current steering angle of the ADV, and a distance tolerance associated with sensor measurements of the ADV;
   projecting the tolerance area onto a high definition (HD) map, the HD map including information describing the first static object, wherein the projecting of the tolerance area onto the HD map includes locating a corresponding position on the HD map for each vertex of the tolerance area;
   performing a localization operation using a localization module in the ADV to determine a second location of the ADV on the HD map, wherein the localization module uses a global positioning system (GPS) to determine the second location;
   determining whether the second location is outside of the tolerance area that has been projected on the HD map; and
   generating an alarm or a control command to control the ADV, in response to determining that the second location is outside of the tolerance area on the HD map.

2. The method of claim 1, wherein the first location of the ADV is further determined based on a second distance between the ADV and a second static object and a location of the second static object.

3. The method of claim 2, wherein each of the first distance and the second distance is measured by one or more sensors mounted on the ADV, or by one or more roadside devices.

4. The method of claim 2, wherein the localization module determines the second location based on a first data from one or more sensors in the ADV, a second data from a point cloud map, or a combination of the first data and the second data.

5. The method of claim 2, wherein the tolerance area is a parallelogram formed by a first pair of parallel lines and a second pair of parallel lines, the first pair of parallel lines representing a first error tolerance range of a distance sensor in measuring the first distance, and the second pair of parallel lines representing a second error tolerance range of the distance sensor in measuring the second distance.

6. The method of claim 1, wherein generating the control command to control the ADV comprises controlling the ADV to follow a current lane based on lane marking of the current lane, in response to determining that the second location is outside of the tolerance area on the HD map.

7. The method of claim 6, further comprising:
   activating a timer in response to determining that the second location is outside of the tolerance area on the HD map; and
   activating a safety procedure to control the ADV into a safer position, in response to determining that the timer expires and the second location is still outside of the tolerance area on the HD map.

8. The method of claim 7, wherein activating a safe procedure to control the ADV into a safer position comprises stopping or parking the ADV.

9. The method of claim 1, wherein a number of error tolerance parameters used to calculate the tolerance area depends on a driving environment of the ADV.

10. The method of claim 9, wherein when the ADV is travelling in a first driving environment wherein traffic is light, the speed tolerance and the distance tolerance are utilized to calculate the tolerance area;
    wherein when the ADV is travelling in a second driving environment where traffic is heavy, each of the plurality of error tolerance parameters is utilized to calculate the tolerance area.

11. A non-transitory machine-readable medium having instructions stored therein, which when executed by a processor, causing the processor to perform operations of monitoring localization functions in an autonomous driving vehicle (ADV), the operations comprising:
    determining a first location of the ADV based at least on a first distance between the ADV and a first static object and a location of the first static object;
    calculating a tolerance area surrounding the first location based on a plurality of error tolerance parameters, wherein the tolerance area is a polygon, and where the plurality of error tolerance parameters include a speed tolerance associated with a current speed of the ADV, a steering angle tolerance associated with a current steering angle of the ADV, and a distance tolerance associated with sensor measurements of the ADV;
    projecting the tolerance area onto a high definition (HD) map, the HD map including information describing the first static object, wherein the projecting of the tolerance area onto the HD map includes locating a corresponding position on the HD map for each vertex of the tolerance area;
    performing a localization operation using a localization module in the ADV to determine a second location of the ADV on the HD map, wherein the localization module uses a global positioning system (GPS) to determine the second location;
    determining whether the second location is outside of the tolerance area that has been projected on the HD map; and
    generating an alarm or a control command to control the ADV, in response to determining that the second location is outside of the tolerance area on the HD map.

12. The non-transitory machine-readable medium of claim 11, wherein the first location of the ADV is further determined based on a second distance between the ADV and a second static object and a location of the second static object.

13. The non-transitory machine-readable medium of claim 12, wherein each of the first distance and the second distance is measured by one or more sensors mounted on the ADV, or by one or more roadside devices.

14. The non-transitory machine-readable medium of claim 11, wherein the localization module determines the second location based on a first data from one or more sensors in the ADV, a second data from a point cloud map, or a combination of the first data and the second data.

15. The non-transitory machine-readable medium of claim 11, wherein generating the control command to control the ADV comprises controlling the ADV to follow a current lane based on lane marking of the current lane, in response to determining that the second location is outside of the tolerance area on the HD map.

16. The non-transitory machine-readable medium of claim 15, wherein the operations further comprise:
   activating a timer in response to determining that the second location is outside of the tolerance area on the HD map; and
   activating a safety procedure to control the ADV into a safer position, in response to determining that the timer expires and the second location is still outside of the tolerance area on the HD map.

17. The non-transitory machine-readable medium of claim 16, wherein activating a safe procedure to control the ADV into a safer position comprises stopping or parking the ADV.

18. A data processing system, comprising:
   a processor; and
   a memory coupled to the processor to store instructions, which when executed by a processor, cause the processor to perform operations of monitoring localization functions in an autonomous driving vehicle (ADV), the operations comprising:
      determining a first location of the ADV based at least on a first distance between the ADV and a first static object and a location of the first static object,
      calculating a tolerance area surrounding the first location based on a plurality of error tolerance parameters, wherein the tolerance area is a polygon, and where the plurality of error tolerance parameters include a speed tolerance associated with a current speed of the ADV, a steering angle tolerance associated with a current steering angle of the ADV, and a distance tolerance associated with sensor measurements of the ADV,
      projecting the tolerance area onto a high definition (HD) map, the HD map including information describing the first static object, wherein the projecting of the tolerance area onto the HD map includes locating a corresponding position on the HD map for each vertex of the tolerance area,
      performing a localization operation using a localization module in the ADV to determine a second location of the ADV on the HD map, wherein the localization module uses a global positioning system (GPS) to determine the second location,
      determining whether the second location is outside of the tolerance area that has been projected on the HD map, and
      generating an alarm or a control command to control the ADV, in response to determining that the second location is outside of the tolerance area on the HD map.

19. The system of claim 18, wherein the first location of the ADV is further determined based on a second distance between the ADV and a second static object and a location of the second static object, wherein each of the first distance and the second distance is measured by one or more sensors mounted on the ADV, or by one or more roadside devices.

20. The system of claim 18, wherein the localization module determines the second location based on a first data from one or more sensors in the ADV, a second data from a point cloud map, or a combination of the first data and the second data.

21. The system of claim 18, wherein generating the control command to control the ADV comprises controlling the ADV to follow a current lane based on lane marking of the current lane, in response to determining that the second location is outside of the tolerance area on the HD map.

22. The system of claim 21, wherein activating a safe procedure to control the ADV into a safer position comprises stopping or parking the ADV.

23. The system of claim 18, wherein generating the control command to control the ADV comprises:
   controlling the ADV to follow a current lane based on lane marking of the current lane, in response to determining that the second location is outside of the tolerance area on the HD map;
   activating a timer in response to determining that the second location is outside of the tolerance area on the HD map; and
   activating a safety procedure to control the ADV into a safer position, in response to determining that the timer expires and the second location is still outside of the tolerance area on the HD map.

* * * * *